Dec. 17, 1968          H. J. THIELSCH          3,416,344

METHOD AND MEANS FOR FORMING FITTINGS

Original Filed March 28, 1963          10 Sheets—Sheet 1

INVENTOR.
HELMUT J. THIELSCH
BY Howard R. Goldberg
ATTORNEY

Dec. 17, 1968     H. J. THIELSCH     3,416,344
METHOD AND MEANS FOR FORMING FITTINGS
Original Filed March 28, 1963     10 Sheets-Sheet 2

INVENTOR.
HELMUT J. THIELSCH
BY Howard R. Goldberg
ATTORNEY

Dec. 17, 1968 H. J. THIELSCH 3,416,344
METHOD AND MEANS FOR FORMING FITTINGS
Original Filed March 28, 1963 10 Sheets-Sheet 4

INVENTOR.
HELMUT J. THIELSCH
BY Howard R. Goldberg
ATTORNEY

Dec. 17, 1968     H. J. THIELSCH     3,416,344
METHOD AND MEANS FOR FORMING FITTINGS
Original Filed March 28, 1963     10 Sheets-Sheet 5
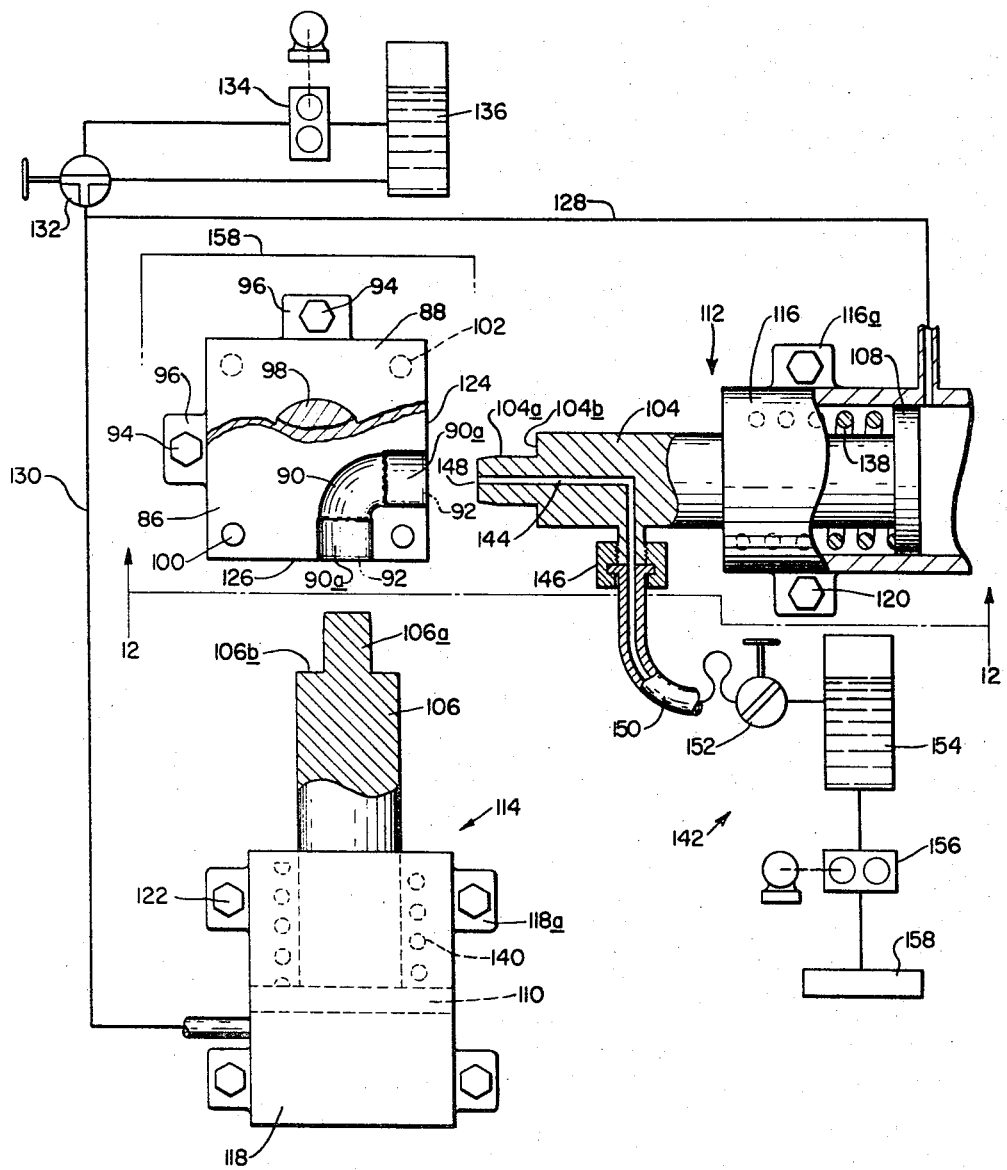
FIG. II
INVENTOR.
HELMUT J. THIELSCH
BY Howard R. Goldberg
ATTORNEY Dec. 17, 1968  H. J. THIELSCH  3,416,344
METHOD AND MEANS FOR FORMING FITTINGS
Original Filed March 28, 1963  10 Sheets-Sheet 6
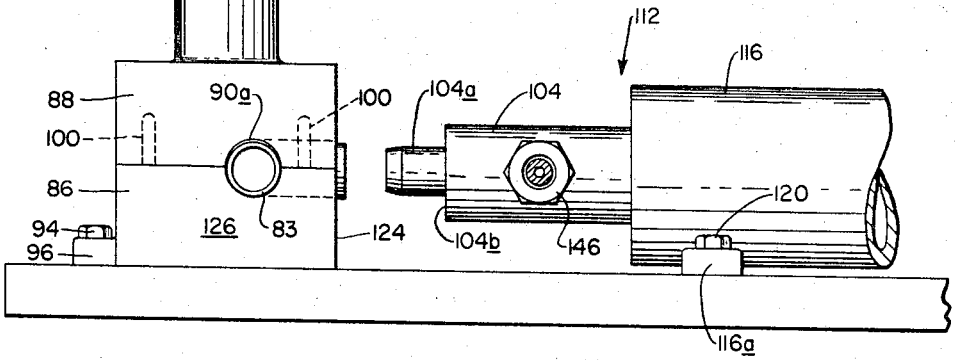
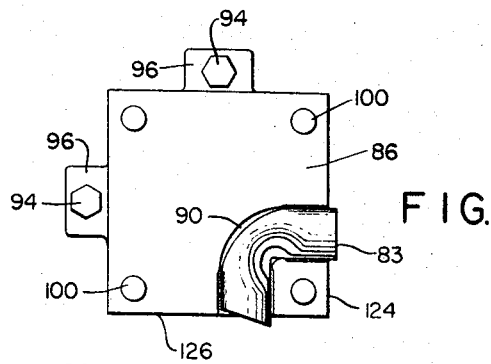
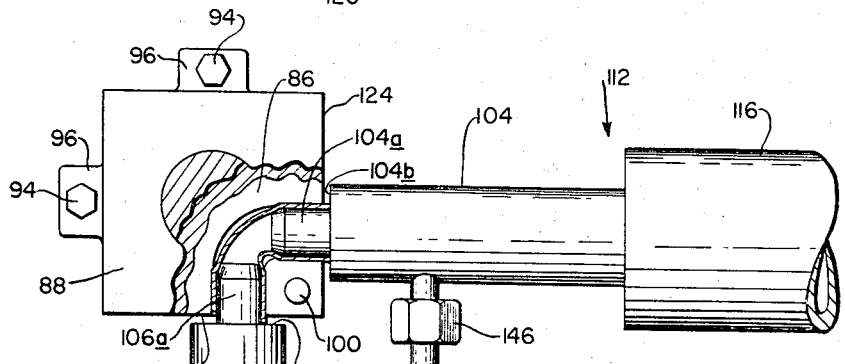
INVENTOR.
HELMUT J. THIELSCH
BY Howard R. Goldberg
ATTORNEY Dec. 17, 1968 H. J. THIELSCH 3,416,344
METHOD AND MEANS FOR FORMING FITTINGS
Original Filed March 28, 1963 10 Sheets-Sheet 7

INVENTOR.
HELMUT J. THIELSCH
BY Howard R. Goldberg

ATTORNEY

Dec. 17, 1968 H. J. THIELSCH 3,416,344
METHOD AND MEANS FOR FORMING FITTINGS
Original Filed March 28, 1963 10 Sheets-Sheet 8

INVENTOR.
HELMUT J. THIELSCH
BY Howard R. Goldberg
ATTORNEY

INVENTOR.
HELMUT J. THIELSCH
BY Howard R. Goldberg

ATTORNEY

Dec. 17, 1968  H. J. THIELSCH  3,416,344
METHOD AND MEANS FOR FORMING FITTINGS
Original Filed March 28, 1963  10 Sheets-Sheet 10

INVENTOR.
HELMUT J. THIELSCH
BY Howard R. Goldberg

ATTORNEY

United States Patent Office 3,416,344
Patented Dec. 17, 1968

3,416,344
METHOD AND MEANS FOR FORMING FITTINGS
Helmut J. Thielsch, Cranston, R.I., assignor to Grinnell Corporation, Providence, R.I., a corporation of Delaware
Original application Mar. 28, 1963, Ser. No. 268,658, now Patent No. 3,303,680, dated Feb. 14, 1967. Divided and this application Mar. 15, 1966, Ser. No. 534,464
1 Claim. (Cl. 72—58)

ABSTRACT OF THE DISCLOSURE

An apparatus for forming a finished elbow fitting from a tubuar workpiece having a partially collapsed central bend, includes a die with a cavity conforming to the finished elbow and dimensioned to receive the workpiece with its ends protruding from openings at the ends of the cavity. A plunger has an end which can be advanced into the cavity opening, and a shoulder which engages a protruding end of the workpiece as the plunger advances, forcing the end into the cavity. The shoulder is arrested in an advanced position in which it closes the cavity opening. Pressure fluid is introduced into the workpiece to expand the collapsed bend through a conduit which opens through the end face of the plunger.

---

This application is a division of my co-pending application Ser. No. 268,658, filed Mar. 28, 1963, now U.S. Patent No. 3,303,680, issued Feb. 14, 1967.

The making of fittings, for example, copper solder fittings, by bending tubular stock and subsequently shaping the bent piece by internal pressure is generally old. However, there have been a number of problems associated with this general technique that have made it unattractive for commercial production.

One of these problems has been with respect to the avoidance of scrap. Thus, it is desirable to begin the method with the exact amount of material needed in the final fitting, rather than start with a larger amount and cut away or otherwise dispose of a portion during the forming operation. The difficulty has been that when the starting form is tubular and the final form is short relative to the tubular diameter, for example a short radius elbow, the bending operation has a tendency to collapse the ends of the stock adjacent the bend and to distort the ends so that their faces are not squared off.

Collapse of the ends is undesirable because of the obstacle it presents to subsequent sealing of the interior of the fitting preparatory to the introduction of fluid pressure. In particular, such collapse will prevent easy closing of the dies which confine the bent piece because the largest dimension of the collapsed end will exceed the diameter of the final die cavity. In addition, such collapse will hinder the insertion of sealing plugs into the ends of the bent piece while it is in the final dies.

As to the distortion of an end face (or end faces) of the piece by the bending operation this has been undesirable in the past because it has necessitated squaring off by another operation and produces scrap.

I have discovered a novel method and novel tooling for preventing any collapse of the ends of the piece which would interfere with closing of the final confining dies.

In addition, I have discovered a novel method and novel tooling for simultaneously squaring off the ends of the piece and sealing its interior sufficiently tight to withstand the high fluid pressure required for the final forming step. This squaring off involves a shaping of the ends rather than a cutting so that no scrap is involved.

Another problem in the prior art has been with respect to the collapsing of the tubular stock at the bend. The collapsing in this region has been such that it too has prevented the bent piece from fitting easily in the cavity of the final die when this die is closed. In this region of the bend, some collapsing is inevitable, and the problem is not to eliminate it but to control it so that the final dies will close easily on the bent piece. The forces involved in the bending are enormous, and a problem subsidiary to that of preventing a collapse which will unduly widen the piece is the problem of preventing scoring of the exterior surface of the piece by the bending tools.

I have discovered a novel method and novel tooling which will provide an adequate initial bend in the tubular stock and at the same time prevent undue widening of the piece at this bend and scoring of the external surface.

In general a preferred form of practicing my novel method invention with preferred tooling in accordance with my novel apparatus invention involves inserting a special plug in the end of a long piece of tubing, bending the tubing near the end having the plug and simultaneously partially withdrawing the plug in a controlled manner, removing the plug, cutting the tubing on the other side of the bend from the end which received the plug, inserting the resulting bent piece in a die cavity having the shape of the final fitting and having faces beyond which the ends of the bent piece project, inserting shouldered plungers into these ends and advancing these plungers until the shoulders drive the projecting portions into the die cavity around the plungers to seal the interior of the piece, and then introducing fluid under high pressure through one of said plungers and into said interior. The special plug has its end provided with a rounded end and a slight taper to permit withdrawal from the piece without galling the interior surface thereof. The bending tools include a forked ram having internal faces which embrace the opposite sides of the bend and prevent widening of the piece at the bend. They also include a pair of pivoted spaced apart cradles for supporting the ends of the piece during the bending operation, these cradles being pivoted in such a way that at the completion of the bend they complement the corresponding surfaces of the forked piece and being spaced apart in such a way that the desirable gap exists between these cradles across the long side of the bend.

Accordingly, it is an object of the present invention to provide a novel method for forming fittings from tubular stock which involves variably supporting one end of the stock during bending.

Another object is to provide a novel method of the kind described which involves confining the exterior support from one end of the stock during bending.

Another object is to provide a novel method of the kind described which involves confining the exterior sides of the stock at the bend during the bending operation.

Another object is to provide a method of the kind described which involves supporting the exterior of the stock on the long side of the bend at a varying distance from the center of the bend during the bending operation.

Another object of the present invention is to provide a method of the kind described which involves compressing the ends of a bent piece to simultaneously square off these ends and force portions of the material thereof into a sealing position in the ends of a die cavity.

Another object is to provide a method of the kind described which involves locating a bent piece of stock in a die cavity having the final fitting shape with the ends of the piece extending from exterior faces of the die, followed by driving the material of the extending ends into the die cavity to form a high pressure fluid seal between the piece and the die.

Another object is to provide a novel method of forming fittings which avoids scrap, which requires relatively simple tooling, which lends itself to commercial production techniques and which is inexpensive and easy to practice.

Another object is to provide novel apparatus for forming fittings from tubular stock, which apparatus includes a plug for supporting the shape of the end of the stock during the bending.

Another object is to provide a plug of the kind described which is shaped with a novel taper.

Another object is to provide a plug of the kind described which is constructed so as to permit its partial withdrawal from the end of the piece of stock during the bending operation.

Another object is to provide a forked bending ram having cradles for receiving the bent piece and having extending side plates for preventing outward movement of the sides of the bend.

Another object is to provide supporting cradles which are positioned to cooperate with the ram to hold the piece during bending, which are pivoted to follow the bending piece and which are spaced apart an amount varying with pivotal rotation.

Another object is to provide a final forming die having a cavity therein with ends which are flush with special die faces and which are so located that the ends of the bent piece project slightly beyond these faces when the piece is inserted in the cavity preparatory to the final forming.

Another object is to provide a pair of plungers which are insertable in the ends of the piece when the piece is in the die and which have shoulders adapted to engage these ends and to drive them into the die cavity.

Another object is to provide tooling of the kind described which is simple in design and inexpensive to manufacture, which lends itself to commercial production techniques and which is inexpensive to maintain and operate.

Other objects will appear hereinafter.

The best modes in which it has been contemplated applying the principles of the present invention are shown in the accompanying drawings but these are to be deemed primarily illustrative for it is intended that the patent shall cover by suitable expression in the appended claims whatever of patentable novelty resides in the invention disclosed.

In the drawings:

FIGURE 11 is a partially diagrammatic and partially cross-sectioned plan view of a die for finally forming the bent piece of FIG. 10;

FIGURE 12 is a side elevation view taken on line 12—12 of FIG. 11;

FIGURE 13 is a fragmentary view of the lower half of the die of FIG. 11, showing the bent piece located in the die cavity;

FIGURE 14 is a view like FIG. 13 but showing the plungers inserted in the projecting ends of the bent piece of tubing and showing the upper half at the die in closed position;

Figure 17:
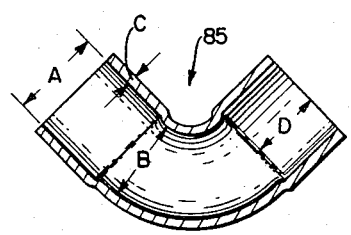
FIGURE 17 is a cross-sectioned view of the final fitting shape.

Referring now more particularly to the drawings, to practice the method of the present invention necessitates the preparation or selection of a piece of tubing stock which has dimensions bearing a relation to the final fitting to be formed which depends upon the dimensions of such final fitting. In the example of a practicing of the method which is the first to be described the fitting to be formed is a short radius 90° ½ inch elbow shown in FIG. 17. The minimum dimensions of the finished elbow are as follows with reference to the letters set forth in FIG. 17:

$(A) = .629$ inch
$(B) = .520$ inch
$(C) = .036$ inch
$(D) = .500$ inch

The dimensions of a tubing stock which can be used to form the above fittings are as follows with reference to the letters set forth in FIG. 1:

$(E) = .671$ inch
$(F) = .593$ inch

The material in the tubing stock in this example is commercial grade soft copper.

Figure 1:
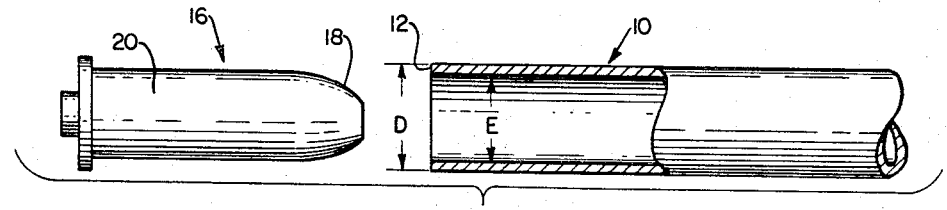
FIGURE 1 is a side elevation view of a length of tubing (partially cross-sectioned) and an end plug separate from, and aligned for insertion in, the tubing.

Referring further to FIG. 1, the copper tubing 10 has a length many times greater than the length of the final elbow, and the end 12 of this tubing from which the elbow is to be formed is initially squared off as shown in FIG. 1. This end need not be exactly square, however, as will be appreciated later herein.

FIGURE 1 also shows a solid end plug 16 adapted to be inserted into the end 12 of the tube 10. This end plug has a rounded portion 18 and has a cylindrical portion 20 with a diameter slightly smaller than the inside diameter of the tube 10 so that it will enter the tube easily.

Figure 2:
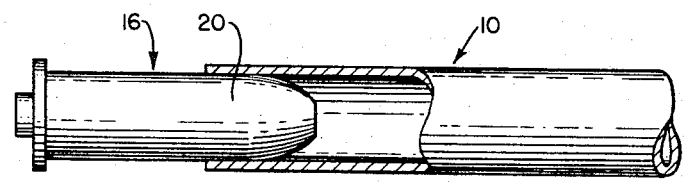
FIGURE 2 is a view like FIG. 1, but showing the plug inserted in the tubing.

FIGURE 2 shows the end plug 16 inserted into the tube 10 until a substantial amount of the cylindrical portion 20 has entered the tube.

Figure 3:
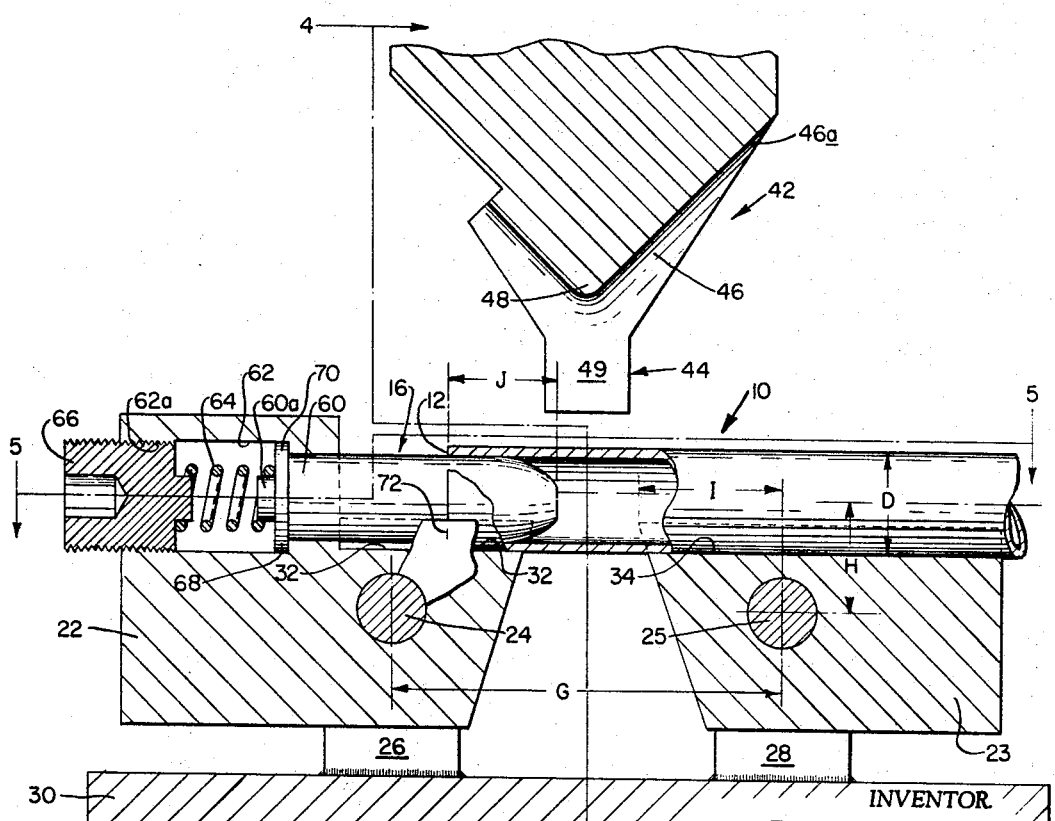
FIGURE 3 is a cross-sectioned side elevation view taken on line 3—3 of FIG. 4 and showing the tubing and end plug assembly of FIG. 2 in position for bending by special bending tools.
Figure 4:
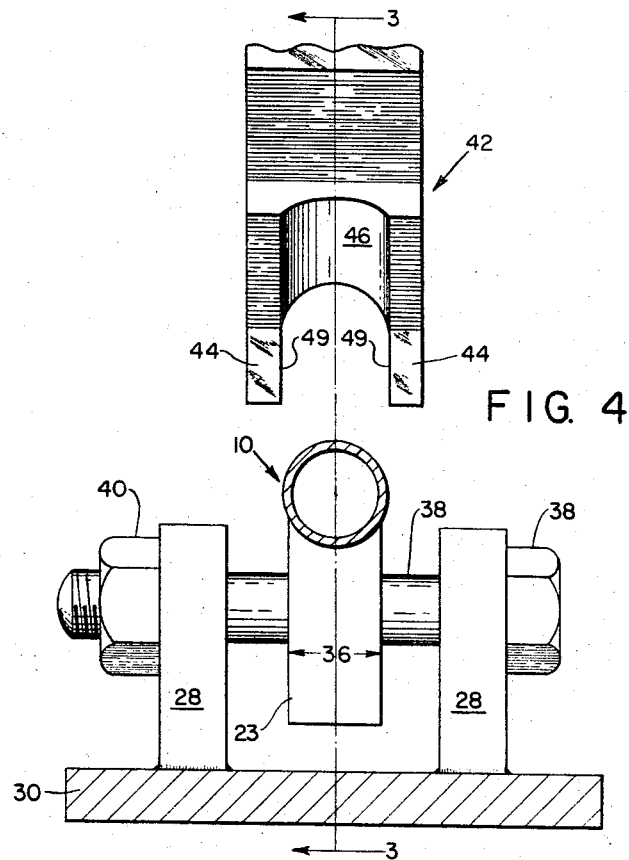
FIGURE 4 is a cross-sectioned end elevation view taken on line 4—4 of FIG. 3.
Figure 5:
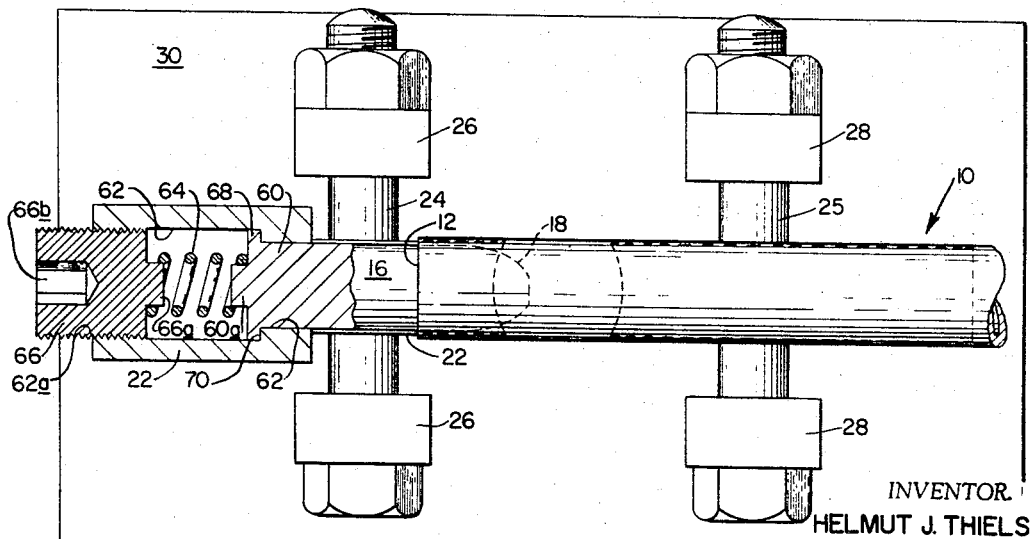
FIGURE 5 is a plan view taken on line 5—5 of FIG. 3.
Figure 6:
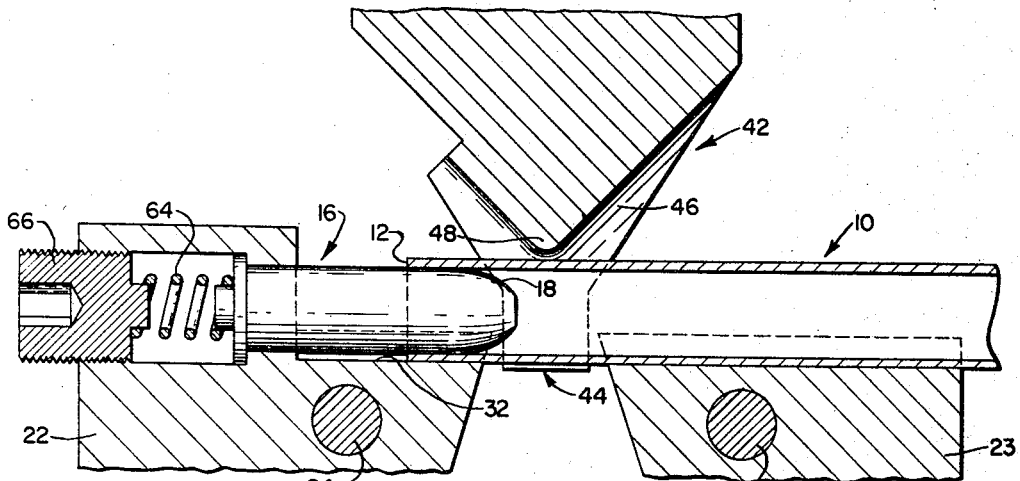
FIGURES 6–9 are views like FIG. 3 but showing various stages in the bending operation.
Figure 7:
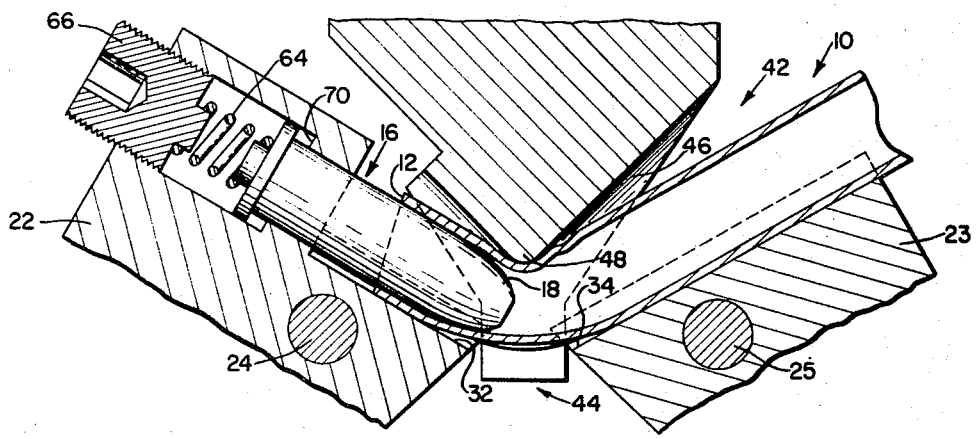
Figure 8:
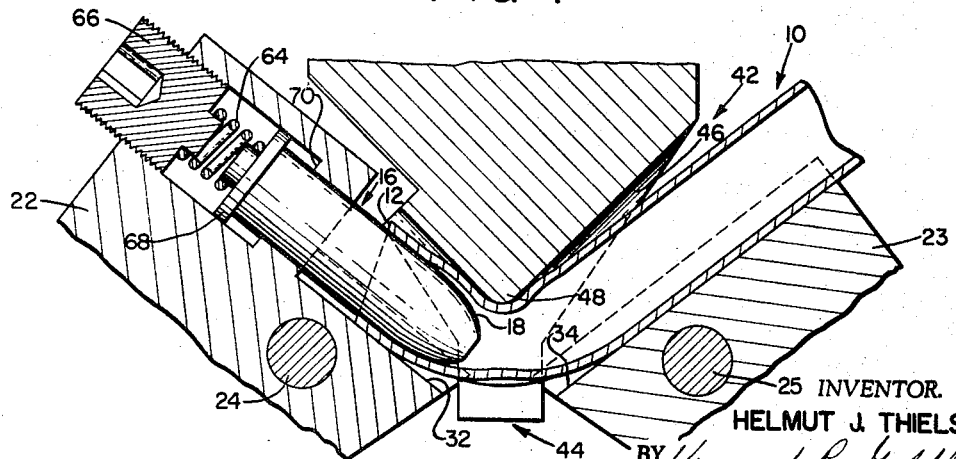

Next the assembly of FIG. 2 is located in the bending tooling of FIG. 3 which includes a pair of pivoted blocks 22 and 23 pivoted at 24 and 25, respectively, to upright frame members 26 and 28 on a base 30. The blocks are aligned with each other and have the upper edges 32 and 34 in the form of curved grooves which fit the outside surface of the tubing over an arc of about 120°, the blocks being provided with sufficient thickness 36 for this purpose.

The pivot connections between the upright frame members and the blocks comprise bolts 38 and nuts 40 therefor. Preferably the blocks are free to move between the upright frame members (along the bolts) to enable slight adjustment of the blocks with respect to each other and with respect to the bending ram 42.

This ram 42 is essentially a forked member having a pair of spaced apart depending side plates 44 which are separated by a distance only slightly greater than the outside diameter of the tubing. Accordingly, when the ram is lowered these side plates pass on opposite sides of the portion of the tubing extending between the blocks. The ram surface 46 is concaved and cylindrical to fit the tubing and is bent around a 90° corner 48 located between the side plates. The inside surfaces 49 of the side plates blend smoothly into the surface 46, and toward the remote ends 46a of the surface 46 the side plates disappear.

The blocks 22 and 23 are spaced apart as shown and are so pivoted at 24 and 25 with respect to their grooved upper edges 32 and 34 that when the ram is moved downward to start the bend the grooves swing inwardly and downwardly. This tends to feed the tubing material toward the bend which is a desirable motion, particularly on the long side of the bend, because the material there tends to be stretched during the bending. In the example of the drawings the lettered dimensions in terms of the outside diameter D of the tubing are in accordance with the following table:

$$(G)=5.813D$$
$$(H)=1.375D$$
$$(I)=2.250D$$
$$(J)=1.625D$$

The end plug 16 is for the purpose of preventing collapse of the tubing end 12. It fits loosely in the tubing so that it can move during bending. At the same time its end 60 is guided in a passage 62 formed in the block 22, and a spring 64 located in the passage 62 and confined by a threaded stop 66 permits motion of the end plug 16 to the left from the position shown in FIG. 3. More particularly the end plug end 60 and a threaded stop 66 are provided with spring centering stubs 60a and 66a, respectively, and the outer end of the passage 62 is internally threaded at 62a to receive this stop 66 which also has a socket 66b for adjustment. Preferably the stop is adjusted so that the spring 64 is just relaxed when the shoulder 68 on the end plug 16 engages the shoulder 70 on the passage 62. In the example of the drawings the spring has a constant of one pound per inch.

The block 22 has a mark 72 with which the tubing end 12 is registered prior to bending. The location of this mark 72 is such that the leg length of the bent piece exceeds the leg length of the finished elbow by a certain amount, as will be more fully explained hereinafter.

With the straight piece of tubing 10 thus placed over the end of the end plug 16 and in the grooves 32 and 34 of blocks 22 and 23, the ram 42 is lowered, bringing the corner 48 of the concave surface 46 down perpendicularly into engagement with the tubing midway between the blocks. The side plates 44 of the ram pass on either side of the tubing and confine it prior to engagement of the corner 48.

FIGURES 6, 7 and 8 and 9 illustrate the progression of the bending operation, and show particularly the cooperation between the movements of the grooved edges and the end plug relative to the tubing. Because of the location of the pivots 24 and 25, the grooved edges 32 and 34 rotate (around these pivots) toward each other and downwardly as the tubing is bent by the ram 42. This rotation is being caused by the bending of the tubing, and more particularly by pressure of the tubing against the grooves 34 and 32 at points between the pivots. An unexpected result is that fact that the surfaces of the grooves 32 and 34 move inwardly toward the tubing bend relative to the surface of the tubing which engages them. The result of this relative motion seems to be that friction between the surfaces of the grooves and the tubing tends to "feed" the metal of the tubing toward the outside of the bend where it is required.

FIGURES 6, 7, 8 and 9 also illustrate the cooperation between the movements of the end plug 16 and the tubing. Thus, in general, the plug 16 is squeezed out of the tubing end by the partial collapsing of the tubing at the bend. On the other hand, a balance is struck here between withdrawal of the end plug to permit some such necessary collapsing at the bend and inward pressure by the plug to maintain roundness along as much of the ends of the bent piece as possible. This balance is achieved by rounding the plug end 18 so that it does not bite into the interior tubing surface, and so that some collapsing can take place adjacent the plug, and by spring loading the plug inwardly.

Figure 10:
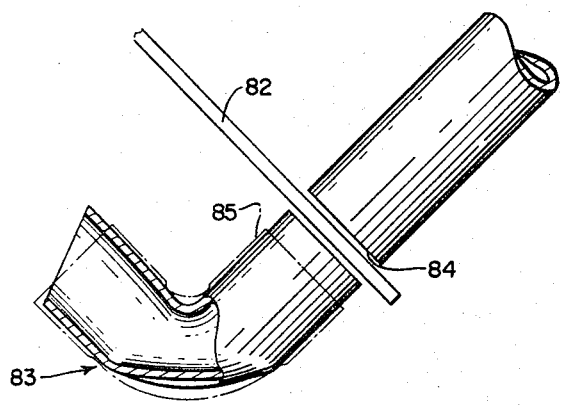
FIGURE 10 is a side elevation view (partly sectioned) of the bent tubing showing the end plug removed and the bent piece being separated from the rest of the tubing.

FIGURE 10 shows how the bent portion is separated from the rest of the tubing stock, in this case by a saw 82, to obtain a bent piece 83, and further shows that the cut 84 makes the lengths of the two legs of the bent piece about equal. In FIG. 10 the outline of the finished elbow 85 is super-imposed in light dotted lines to give a size and length comparison.

FIGURE 11 shows the die and fluid pressure equipment which changes the bent piece of tubing into the final shape. This equipment includes a pair of dies 86 and 88 which fit together to form a cavity 90. This cavity has the precise shape of the finished elbow but is slightly longer than the finished elbow in the socket portions 90a. The dotted lines 92 in FIG. 11 show the ends of the finished socket portions super-imposed. The reason for the additional lengths of the cavity socket portions 90a will appear hereinafter.

The die 86 is fixedly secured to some suitable base, for example by bolts 94 passing through lugs 96. The die 88 is moved vertically with respect to the die 86 by some actuator 98 such as the head of a vertically acting press. Guide pins 100 on the die part 86 are received in holes 102 in the die part 88 and serve to register the cavity halves in these parts.

Plungers 104 and 106 are mounted on the pistons 108 and 110 of horizontally disposed piston-cylinder units 112 and 114 which are aligned with respect to dies 86 and 88 so that the reduced ends 104a and 106a of these plungers enter the cavity socket portions 90a concentrically therewith when pressure is introduced behind the pistons 108 and 110 to move these pistons to their forward positions. The cylinders 116 and 118 of the piston-cylinder units have suitable lugs 116a and 118a by which these units are fixedly secured to the base by bolts 120 and 122.

The reduction of the ends of the plungers produces shoulders 104b and 106b which preferably lie in planes parallel to the sides 124 and 126 of the closed dies 86 and 88. The sides define the ends of the cavity socket portions 90a, so that when the plungers 104 and 106 are in their forward positions the plunger shoulders 104b and 106b engage and are flush with these sides 124 and 126. The fluid pressure for moving the plungers from the rearward positions of FIG. 11 to their forward positions is obtained through lines 128 and 130 which connect through a valve 132 to a pump 134 and a reservoir 136. Springs 138 and 140 serve to return the plungers to their rearward positions when the valve 132 is in the position shown.

Another fluid pressure system 142 provides fluid pressure to a plunger duct 144 running from a side connection 146 to an opening 148 in the end of the reduced portion 104a. From connection 146 a flexible lead 150 runs to a valve 152 which in turn leads to an accumulator tank 154 which in turn is fed by a pump 156 which in turn picks up its supply from a pan 158 surrounding the die parts 86 and 88. Preferably the fluid used is oil and the pressure available is in the neighborhood of 10,000 p.s.i. for a fitting like that of the drawings. Higher pressures would be used for larger fittings.

FIGURE 12 shows a side view of the die parts 86 and 88 and the plunger 104. In this view, however, a bent piece 83 like that of FIG. 10 is shown located in the cavity 90. This particularly shows that the relative lengths of the cavity socket portions 90a and the bent piece are such that a part of the end of the bent piece sticks out beyond the face 124. The same is true with respect to face 126. This is illustrated again in FIG. 13 which shows only the die part 86 with the bent piece 83 resting on the cavity half therein.

Figure 15:
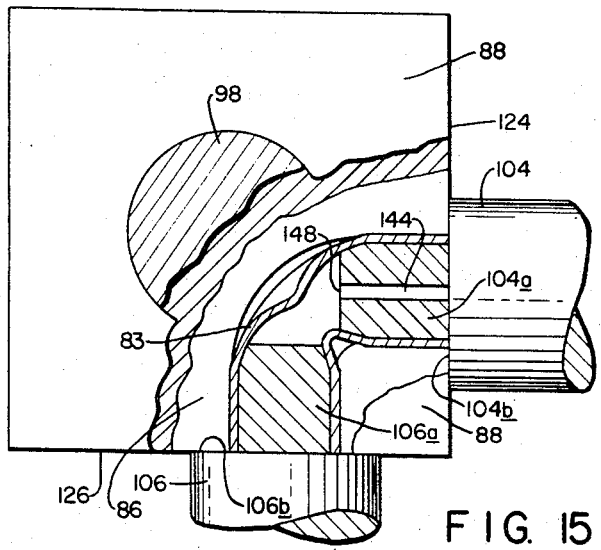
FIGURE 15 is a view like FIG. 14 but showing the plungers advanced to their final positions.

FIGURE 14 shows the reduced ends 104a and 106a of the plungers inserted in the ends of the bent piece until these ends engage the shoulders 104b and 106b. FIGURE 15 shows how the plungers have been further advanced until the shoulders 104b and 106b engage the surfaces 124 and 126. This last-mentioned movement has the effect of squeezing into the spaces between the reduced plunger ends 104a and 106a and the walls of the cavity socket portions 90a all of the tubing material in the portions of the bent piece which extended beyond the faces 124 and 126. This is in the nature of an injection molding with the result that a very close fit is achieved between the metal of the bent piece, the dies 86, 88 and the plunger end 104a and 106a, with the further result that the fluid pressure which is then introduced into the bent piece is sealed in, and with the additional result that some metal is actually squeezed out of the socket regions of the cavity and into the region of the bend where such metal is needed to provide adequate wall thickness when the fluid pressure is later applied. At the same time this crowding of the metal into the dies 86 and 88 has the effect of squaring off the bent piece ends, one of which is normally non-square after the bending operation and the other of which may be rough after the cutting operation. Thus, by this method and apparatus all waste is avoided, and at the same time the ends of the finished elbow are properly squared off. The piece is now prepared to receive and contain the fluid pressure which is the final step.

Figure 16:
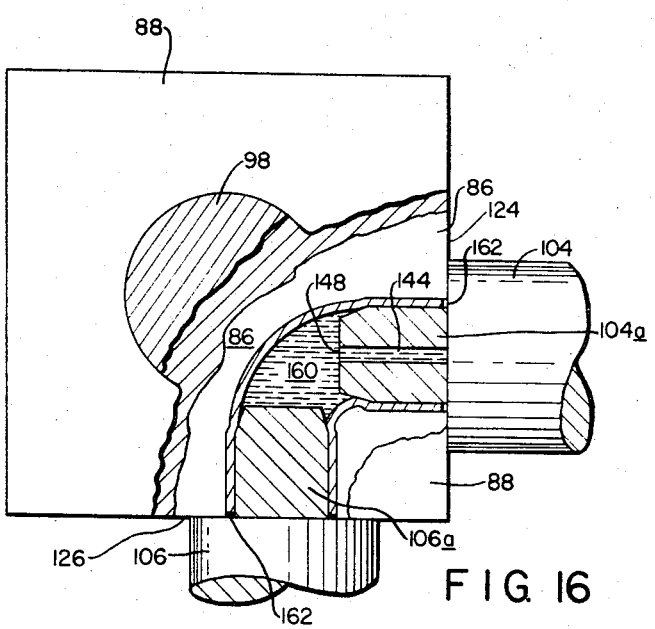
FIGURE 16 is a view like FIG. 15 but showing fluid introduced under pressure to finally form the fitting.

FIGURE 16 shows the bent piece filled with fluid 160 under pressure, preferably in the neighborhood of 10,000 p.s.i., this fluid having been introduced along duct 144 from system 142 and this pressure being sufficient to force the material of the bent piece out against the surfaces of the cavity 90 to complete the final shaping of the fitting. The movement of the material of the bent piece by the fluid pressure actually draws the socket portions inwardly slightly, leaving spaces 162 between the ends of these portions and the plunger shoulders 104b and 106b. This inward movement of the ends of the socket portions is sufficiently uniform all around so that the ends remain square, and the dies 86 and 88 are dimensioned so that this inward movement results in the final elbow having the desired length under the specifications for these elbows.

Figure 9:
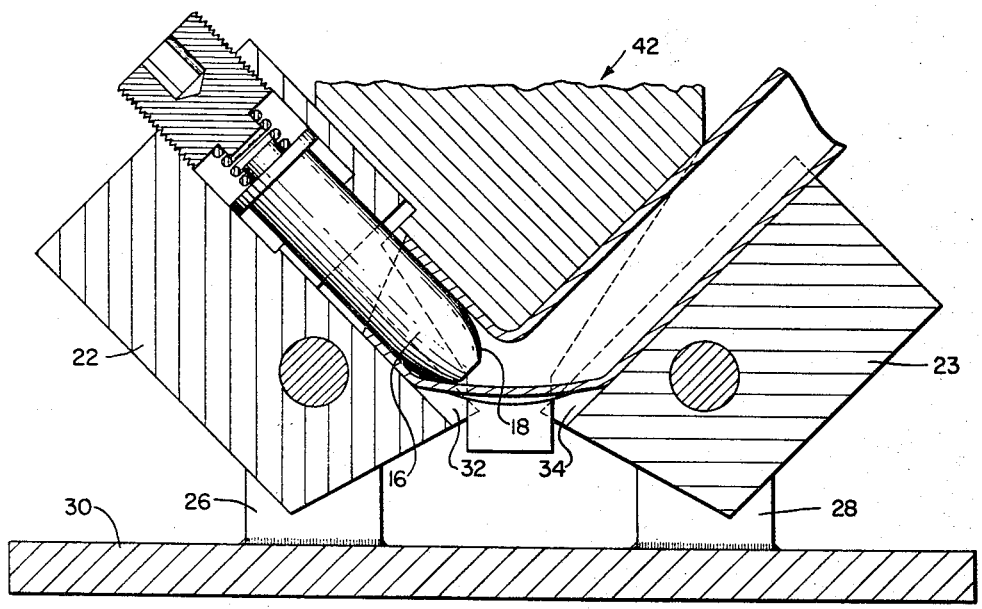
Figure 18:
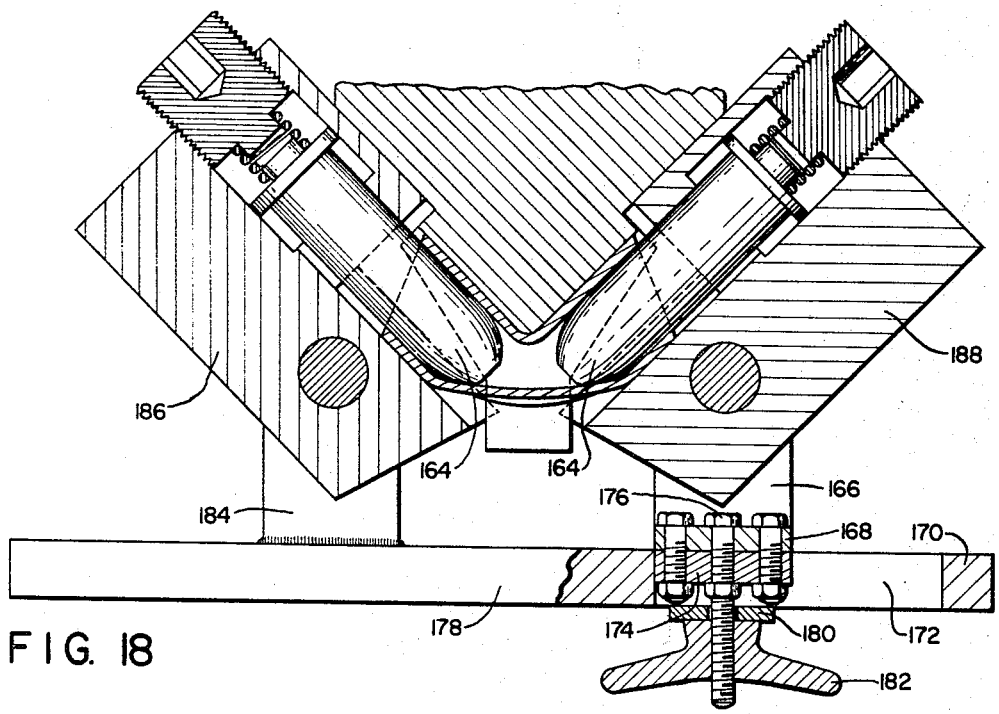
FIGURE 18 is a view like FIG. 9 but showing that the starting piece can be a short length of tubing with two end plugs.

FIGURE 18 shows a practicing of the method of the present invention which involves the use of two end plugs 164 both like end plug 16 of the corresponding FIG. 9. This FIG. 18 shows that the tubing stock can be cut in short lengths which are subsequently bent as shown.

Figure 19:
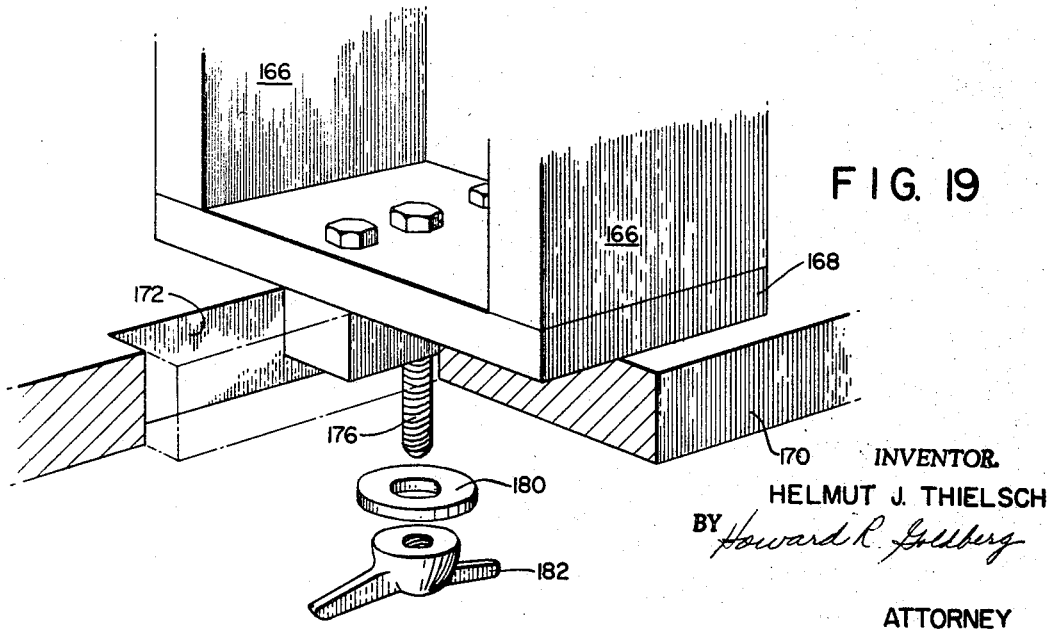
FIGURE 19 is a perspective view of a portion of the tooling of FIG. 18 showing how two of the upright framer members are made adjustable.

To enable these short lengths to be located on the plugs 164 the upright frame members 166 are mounted on a small base 168 movable on the main base 170. More particularly, the main base has a slot 172 which receives a tongue 174 bolted to base 168 by bolts 176. One of these bolts passes through the slot to extend below the lower surface 176 of the main base 170 and is provided with a washer 180 and a wing nut 182 for quick clamping of the small base 168 to the main base. The clamping is released and the frame members 166 are moved to the right (in FIGS. 18 and 19) to enable the tubing piece to be inserted over the end plugs 164. Then the frame members are moved toward the other fixed frame members 184 to properly position the blocks 186 and 188 with respect to each other and to provide the correct amount of insertion of the end plugs into the ends of the short piece of tubing. Then the wing nut 182 is tightened to lock the upright frame members in this position. The tooling is then ready for the bending operation which is the same as that earlier described.

Figure 20:
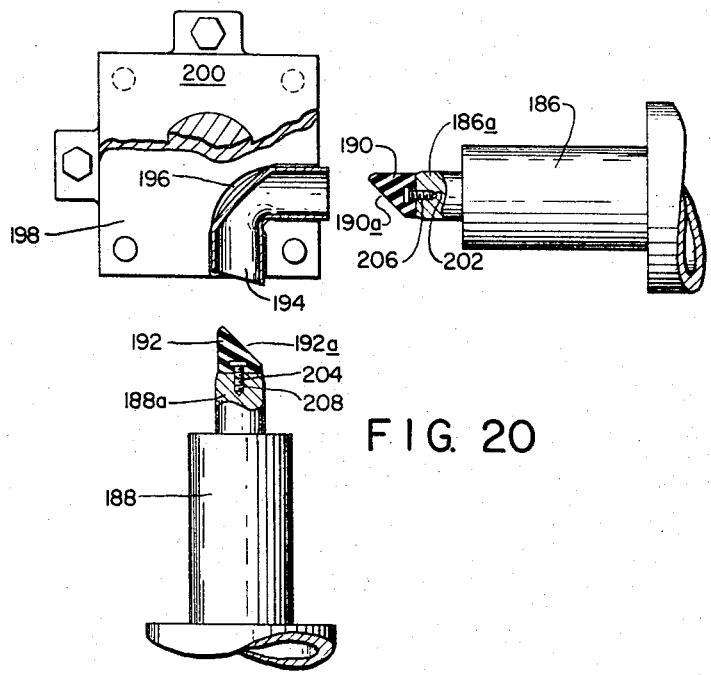
FIGURE 20 is a view like FIG. 11, but showing how a rubber-like material can be used on the ends of the plungers, instead of a hydraulic fluid system, to expand the fitting.
Figure 21:
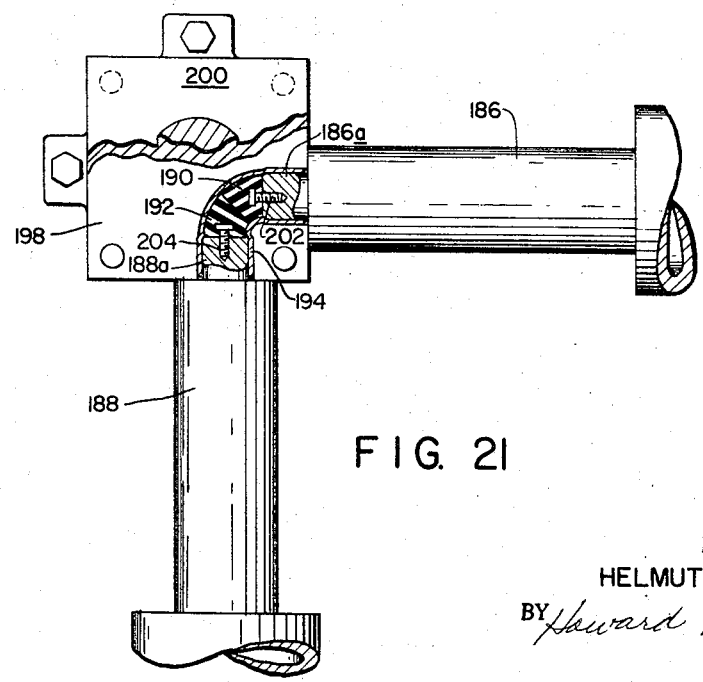
FIGURE 21 is a view like FIG. 20, but showing the plungers advanced to compress the rubber-like material in the fitting.

FIGURE 20 is a view similar to FIG. 11 but showing that this invention can employ deformable solid material to exert the internal pressure in place of the liquid of the earlier embodiments. More particularly, in FIGS. 20 and 21 the plungers 186 and 188 have fastened to their reduced ends 186a and 188a rubber projections 190 and 192. In FIG. 20 the plungers are shown in their withdrawn positions, with a bent piece 194 resting in the die cavity 196. The lower half 198 of the die is shown in full, but the upper half 200 is broken away and the bent piece 194 is sectioned to clarify the disclosure. The rubber projections 190 and 192 are cut on the bias 190a and 192a so that there will be a minimum of distortion of the rubber as it fills the center of the fitting. The rubber projections are designed with a volume slightly larger than that of the center portion of the completed fitting so that when the plungers are advanced to the positions shown in FIG. 21 the rubber is greatly squeezed and provides the high internal pressure required to complete the forming operation.

Preferably the rubber projections are secured to the plungers' ends 186a and 188a by threaded studs 202 and 204 which have their heads embedded in the rubber and which have their shanks threadedly received in tapped holes 206 and 208 in the ends of the reduced plunger portions.

Figure 22:
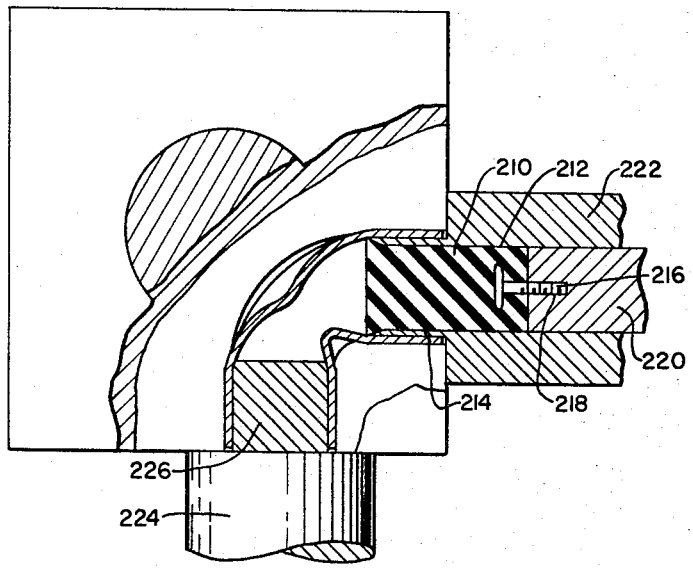
FIGURE 22 is a view of another arrangement employing a rubber-like material which, in this case, is movable in a passage in one of the plungers.
Figure 23:
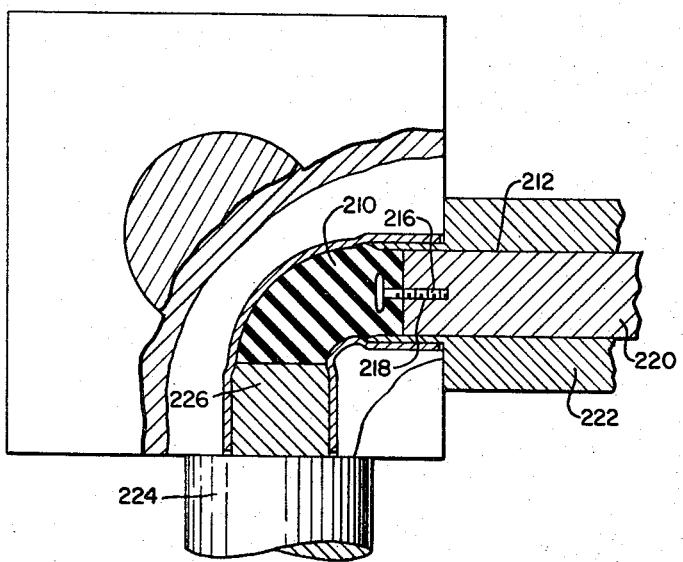
FIGURE 23 is a view like FIG. 22 showing the rubber-like material advanced along the passage and into the fitting.

FIGURES 22 and 23 show another embodiment of the invention also employing a soft material instead of fluid for expanding the center portion of the fitting. In this embodiment, however, the rubber projection 210 is associated with only one of the plungers and is housed in a central passageway 212 therein which is somewhat smaller in diameter than the reduced portion 214. The rubber projection is provided with an embedded stud 216 which is threaded into a tapped hole 218 in a piston member 220 slidable along the interior of the plunger 222. By having the soft material withdrawn into the passageway 212 it is not damaged while the plungers are advanced to the position shown in FIG. 22. The other plunger 224 has a solid reduced end portion 226 like the plunger 106 in FIG. 11. After the plungers are in the positions shown in FIG. 22, the piston 220 is advanced to drive the rubber projection into the interior of the fitting with sufficient force to develop a pressure in this interior adequate to finally form this portion of the fitting against the walls of the cavity.

I claim:
1. Apparatus for forming a finished elbow fitting from a tubular workpiece having a partially collapsed bend between the ends thereof and having these ends spaced predetermined distances from the center of such bend, said apparatus comprising:
  (I) a die having:
    (A) an enclosed cavity having:
      (1) a curved central portion,
      (2) a pair of straight cylindrical end portions which:
        (a) join the ends of said curved central portion,
        (b) have outer ends which:
          (i) are spaced a second distance from the center of said curved portion which is less than said predetermined distances.
          (ii) define the ends of said cavity,
    (B) a pair of openings communicating with the outer ends of said cavity end portions,
  (II) a plunger which:

(A) is movable from a retracted position to an advanced position toward said die,
(B) has an end which:
  (1) has a face,
  (2) has substantially cylindrical side walls,
  (3) in said advanced plunger position:
    (a) lies concentrically in one of said cavity cylindrical end portions,
    (b) defines with said cavity end portion the interior and exterior surface boundaries of one end of the finished elbow fitting,
  (4) in said retracted position:
    (a) lies outside said cavity,
    (b) is spaced from said center of said cavity curved portion a third distance greater than said predetermined distance,
(C) has an annular shoulder which:
  (1) is adjacent said plunger end,
  (2) in said advanced plunger position:
    (a) is at the said outer end of said cavity cylindrical end portion,
    (b) closes one of said cavity openings,
(D) has a fluid conduit which:
  (1) extends along the interior of said plunger,
  (2) has an opening through said plunger end face,
(III) means for moving said plunger from said retracted position to said advanced position, whereby one end of said bent piece is forced into said cavity by said plunger shoulder,
(IV) means fixed with respect to said die and engaging said plunger for arresting the said advance thereof at least after said shoulder reaches said cavity opening,
(V) means for introducing a fluid under pressure into said conduit, whereby the partially collapsed bend in said workpiece is expanded.

References Cited

UNITED STATES PATENTS

| | | | |
|---|---|---|---|
| 1,041,406 | 10/1912 | Bauroth | 72—62 |
| 2,713,314 | 7/1955 | Leuthesser et al. | 72—61 |
| 2,837,810 | 6/1958 | Ekholm. | |
| 2,902,962 | 9/1959 | Garvin | 72—58 |
| 2,918,102 | 12/1959 | Klein | 72—54 |
| 2,952,070 | 9/1960 | Veatch. | |

RICHARD J. HERBST, *Primary Examiner.*